US012591844B1

(12) United States Patent　　(10) Patent No.:　US 12,591,844 B1

Muthusamy et al.　　(45) Date of Patent:　Mar. 31, 2026

(54) AUTONOMOUS MULTI-DIMENSION SEGMENTATION WORKFLOW

(71) Applicant: Blue Yonder Group, Inc., Scottsdale, AZ (US)

(72) Inventors: Ganesh Muthusamy, Hyderabad (IN); Abhishek Singh, Bangalore (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 240 days.

(21) Appl. No.: 17/582,340

(22) Filed: Jan. 24, 2022

Related U.S. Application Data

(60) Provisional application No. 63/146,086, filed on Feb. 5, 2021, provisional application No. 63/140,337, filed on Jan. 22, 2021.

(51) Int. Cl.
　　*G06Q 10/087*　　(2023.01)
(52) U.S. Cl.
　　CPC ................................. *G06Q 10/087* (2013.01)
(58) Field of Classification Search
　　None
　　See application file for complete search history.

(56) References Cited

U.S. PATENT DOCUMENTS 7,523,483 B2　4/2009　Dogan et al.
10,706,323 B1 *　7/2020　Liebman ................ G06N 20/00

| 2011/0010226 | A1 * | 1/2011 | Guild | ................. | G06Q 30/0202 |
| | | | | | 705/7.31 |
| 2014/0019471 | A1 * | 1/2014 | Linton | ................. | G05B 19/418 |
| | | | | | 707/759 |
| 2015/0269617 | A1 * | 9/2015 | Mikurak | ............ | G06Q 30/0633 |
| | | | | | 705/14.54 |
| 2021/0158259 | A1 * | 5/2021 | Evans | .................. | G06Q 30/016 |
| 2021/0182996 | A1 * | 6/2021 | Cella | .................. | G06Q 10/0637 |

OTHER PUBLICATIONS

Fichtinger et al., "A joint network design and multi-echelon inventory optimisation approach for supply chain segmentation," International Journal of Production Economics, vol. 209, pp. 103-111, 2017.

Godsell et al., "Enabling supply chain segmentation through demand profiling," International Journal of Physical Distribution & Logistics Management, vol. 41, Issue 3, pp. 296-314, 2011.

* cited by examiner

*Primary Examiner* — Chesiree A Walton

(74) *Attorney, Agent, or Firm* — Spencer Fane LLP; Steven J. Laureanti

(57) ABSTRACT

A system and method of autonomous multi-dimensional segmentation for a supply chain network. Embodiments include a supply chain network of one or more supply chain entities, a segmentation planner having a computer and memory, the segmentation planner configured to access input data relating to one or more supply chain entities, discover one or more features related to the input data, pre-process the input data and features, perform multi-dimension segmentation on the input data, compute the importance of the one or more features, generate a multi-dimension segmentation visualization, assign policy parameters to the multi-dimension segmentation performed on the input data.

15 Claims, 6 Drawing Sheets

300

302 — MANAGE INPUT DATA

304 — DISCOVER FEATURES

306 — PRE-PROCESS DATA

308 — PERFORM MULTI-DIMENSION SEGMENTATION AND COMPUTE FEATURE IMPORTANCE

310 — VISUALIZE SEGMENT OUTPUT

312 — ASSIGN POLICY PARAMETERS

END

700

DIMENSION IMPORTANCE FOR SEGMENTATION

702 RELATIVE IMPORTANCE SCORE 0.40
0.30
0.20
0.10
0

502a — AVERAGE DEMAND INTERVAL

DEMAND COV 502b

FORECAST 502c

UNIT PRICE — 502d

AUTONOMOUS MULTI-DIMENSION SEGMENTATION WORKFLOW

CROSS-REFERENCE TO RELATED APPLICATIONS

The present disclosure is related to that disclosed in the U.S. Provisional Application No. 63/140,337 filed Jan. 22, 2021, entitled "Autonomous Multi-Dimension Segmentation Workflow", and related to that disclosed in the U.S. Provisional Application No. 63/146,086 filed Feb. 5, 2021, entitled "Autonomous Multi-Dimension Segmentation User Interface Workflow". U.S. Provisional Application Nos. 63/140,337 and 63/146,086 are assigned to the assignee of the present application. The present invention hereby claims priority under 35 U.S.C. § 119(e) to U.S. Provisional Application Nos. 63/140,337 and 63/146,086.

TECHNICAL FIELD

The present disclosure relates generally to segmentation planning and specifically to generating and updating segments autonomously.

BACKGROUND

Segmentation refers to the process of dividing one or more target markets into sub-sections, or segments, that can be targeted with specific products, communications and communication channels, supply chain logistical procedures, and/or other business processes. A business entity may segment a market based on one or more of many possible segmentation features, including but not limited to geographic features (such as customer location, state, rural-urban, etc.), demographic features (such as customer gender, age, or job), behavioral features (such as products tailored towards impulse purchases), and psychological features (such as products designed to appeal to "green" consumers by reducing environmental impact on the planet). A segmentation planner's choice of segments, and the features used to define or select each segment, may also be based on one or more attributes or features of one or more products to be sold to different segments of the market. By way of example and not by way of limitation, attributes or features may include, for one or more products, unit cost, location type, item forecast volume, item historical quantity, coefficient of variability, cumulative demand, and/or any other attribute or features. However, over-segmenting a market based on too many features or attributes may over-complicate supply chain models and plans intended to service the over-segmented market, and under-segmenting a market may improperly mix customers, retailers, suppliers, and manufacturers together into broad segments that fail to account for unique market contours of the customers and business entities. Even initially-correct market segmentation decisions may become out of date quickly as new customers and businesses enter and exit the market faster than the segmentation decisions can be updated. These outcomes lead to inefficient allocation of supply chain inventory and sub-optimal service levels, and are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
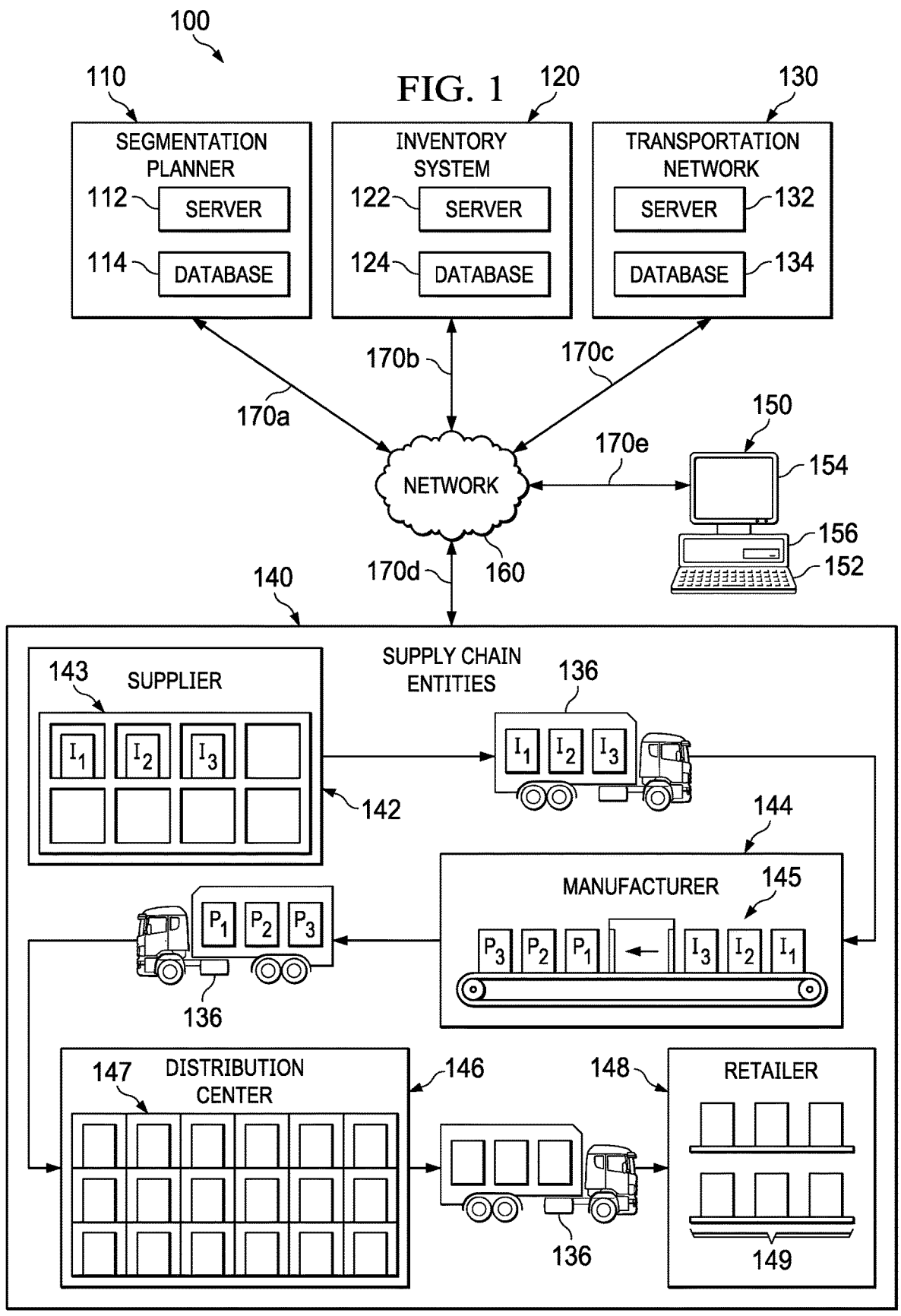
FIG. 1 illustrates an exemplary supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described below, embodiments of the following disclosure provide an autonomous multi-dimension segmentation workflow system and method to provide dynamic, adaptable market segmentation decisions for supply chain networks and business environments. Embodiments utilize a segmentation planner to manage input data, discover segmentation features relevant to the input data, and pre-process the data before generating segments. Embodiments of the segmentation planner analyze the generated segments for one or more unimportant or no-longer-relevant features and, if one or more unimportant or no-longer-relevant features are detected, the segmentation planner removes the unimportant or no-longer-relevant features from the list of segments. Embodiments of the segmentation planner generate one or more graphical user interface (GUI) displays visualizing the segments, and assign policy parameters to the segments.

Embodiments enable segmentation planners to segment markets efficiently and automatically, selecting a sufficient number of segmentation features to adequately segment a market without over-granulizing the market with unnecessary segmentation features. Embodiments autonomously update segmentation decisions as new data become available, circumstances change, and as customers and other businesses enter and exit the market over time, without requiring significant human intervention and/or oversight. Embodiments automatically detect the presence of non-critical features and segments, and remove non-critical features and segments from segmentation planning to reduce operating expenses.

FIG. 1 illustrates an exemplary supply chain network 100 according to a first embodiment. Supply chain network 100 comprises segmentation planner 110, inventory system 120, transportation network 130, one or more supply chain entities 140, computer 150, network 160, and communication links 170a-170e. Although a single segmentation planner 110, inventory system 120, transportation network 130, one or more supply chain entities 140, a single computer 150, and a single network 160 are shown and described, embodiments contemplate any number of segmentation planners 110, inventory systems 120, transportation network 130, supply chain entities 140, computers 150, or networks 160, according to particular needs.

In one embodiment, segmentation planner 110 comprises server 112 and database 114. As described in more detail below, segmentation planner 110 comprises one or more modules to, for example, perform a multi-dimension segmentation to discover segmentation features, generate segments, and to compute the importance of one or more segmentation features.

The inventory system 120 comprises server 122 and database 124. Server 122 of inventory system 120 is configured to receive and transmit inventory data, including but not limited to item identifiers, pricing data, attribute data, features data 224, inventory levels, and other like data about one or more items or products at one or more locations in supply chain network 100. Server 122 stores and retrieves inventory data from database 124 or from one or more locations in supply chain network 100.

According to embodiments, inventory database 124 includes current or projected inventory quantities or states, order rules, or explanatory variables. For example, inventory database 124 may comprise the current level of inventory for each item at one or more stocking points across supply chain network 100. In addition, inventory database 124 may comprise order rules that describe one or more rules or limits on setting an inventory policy, including, but not limited to, a minimum order quantity, a maximum order quantity, a discount, and a step-size order quantity, and batch quantity rules. According to some embodiments, inventory database 124 may comprise explanatory variables that describe the data relating to specific past, current, or future indicators and the data of promotions, seasonality, special events (such as sporting events), weather, and the like. According to some embodiments, segmentation planner 110 accesses and stores inventory data in inventory database 124, which may be used by segmentation planner 110 to generate one or more segments according to the methods described herein. In addition, or as an alternative, the inventory data of inventory database 124 may be updated by receiving current item quantities, mappings, or locations from inventory system 120, transportation network 130, and/or one or more supply chain entities 140.

Transportation network 130 comprises server 132 and database 134. According to embodiments, transportation network 130 directs one or more transportation vehicles 136 to ship one or more items between one or more supply chain entities 140, based, at least in part, on segments and/or instruction sets generated by the segmentation planner 110. The transportation vehicles 136 comprise, for example, any number of trucks, cars, vans, boats, airplanes, unmanned aerial vehicles (UAVs), cranes, robotic machinery, or the like. Transportation vehicles 136 may comprise radio, satellite, or other communication systems that communicate location information (such as, for example, geographic coordinates, distance from a location, global positioning satellite (GPS) information, or the like) with segmentation planner 110, inventory system 120, transportation network 130, and/or one or more supply chain entities 140 to identify the location of transportation vehicle 136 and the location of any inventory or shipment located on transportation vehicle 136. The number of items shipped by transportation vehicles 136 in transportation network 130 may also be based, at least in part, on the number of items currently in stock at one or more supply chain entities 140, the number of items currently in transit in transportation network 130, a forecasted demand, a supply chain disruption, and the like.

As shown in FIG. 1, supply chain network 100 operates on one or more computers 150 that are integral to or separate from the hardware and/or software that support segmentation planner 110, inventory system 120, transportation network 130, and one or more supply chain entities 140. Supply chain network 100 comprising segmentation planner 110, inventory system 120, transportation network 130, and one or more supply chain entities 140 may operate on one or more computers 150 that are integral to or separate from the hardware and/or software that support segmentation planner 110, inventory system 120, transportation network 130, and one or more supply chain entities 140. One or more computers 150 may include any suitable input device 152, such as a keypad, mouse, touch screen, microphone, or other device to input information. One or more computers 150 may also include any suitable output device 154, such as, for example, a computer monitor, that may convey information associated with the operation of supply chain network 100, including digital or analog data, visual information, or audio information. Computer 150 may include fixed or removable computer-readable storage media, including a non-transitory computer readable medium, magnetic computer disks, flash drives, CD-ROM, in-memory device or other suitable media to receive output from and provide input to supply chain network 100.

Computer 150 may include one or more processors 156 and associated memory to execute instructions and manipulate information according to the operation of supply chain network 100 and any of the methods described herein. One or more processors 156 may execute an operating system program stored in memory to control the overall operation of computer 150. For example, one or more processors 156 control the reception and transmission of signals within the system. One or more processors 156 execute other processes and programs resident in memory, such as, for example, registration, identification or communication and moves data into or out of the memory, as required by an executing process. In addition, or as an alternative, embodiments contemplate executing the instructions on computer 150 that cause computer 150 to perform functions of the method. Further examples may also include articles of manufacture including tangible computer-readable media that have computer-readable instructions encoded thereon, and the instructions may comprise instructions to perform functions of the methods described herein.

In addition, supply chain network 100 may comprise a cloud-based computing system having processing and storage devices at one or more locations, local to, or remote from segmentation planner 110, inventory system 120, transportation network 130, and one or more supply chain entities 140. In addition, each of one or more computers 150 may be a work station, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with segmentation planner 110, inventory system 120, transportation network 130, and one or more supply chain entities 140.

These one or more users may include, for example, a "manager" or a "planner" handling generation of segments, supply chain plans and instruction sets, managing the inventory of items, imaging items, managing storage and shipment of items, and/or one or more related tasks within supply chain network 100. In addition, or as an alternative, these one or more users within supply chain network 100 may include, for example, one or more computers 150 programmed to autonomously handle, among other things, shelving resets, task management, communication and assignment of instructions, issue identification and resolution, controlling manufacturing equipment, and adjusting various levels of manufacturing and inventory levels at various stocking points and distribution centers 146, and/or one or more related tasks within supply chain network 100.

One or more supply chain entities 140 represent one or more supply chain networks 100, including one or more enterprises, such as, for example networks 160 of one or more suppliers 142, manufacturers 144, distribution centers 146, retailers 148 (including brick and mortar and online stores), customers, and/or the like. Suppliers 142 may be any suitable entity that offers to sell or otherwise provides one or more items (i.e., materials, components, or products) to one or more manufacturers 144. Suppliers 142 may comprise automated distribution systems 143 that automatically transport products to one or more manufacturers 144 based, at least in part, on supply chain plans and/or instruction sets determined by segmentation planner 110 and/or one or more other factors described herein.

Manufacturers 144 may be any suitable entity that manufactures at least one product. Manufacturers 144 may use one or more items during the manufacturing process to produce any manufactured, fabricated, assembled, or otherwise processed item, material, component, good, or product. In an embodiment, a product represents an item ready to be supplied to, for example, one or more supply chain entities 140 in supply chain network 100, such as retailers 148, an item that needs further processing, or any other item. Manufacturers 144 may, for example, produce and sell a product to suppliers 142, other manufacturers 144, distribution centers 146, retailers 148, a customer, or any other suitable person or entity. Manufacturers 144 may comprise automated robotic production machinery 145 that produce products based, at least in part, on supply chain plans and/or instruction sets determined by segmentation planner 110 and/or one or more other factors described herein.

Distribution centers 146 may be any suitable entity that offers to store or otherwise distribute at least one product to one or more retailers 148 and/or customers. Distribution centers 146 may, for example, receive a product from a first one or more supply chain entities 140 in supply chain network 100 and store and transport the product for a second one or more supply chain entities 140. Distribution centers 146 may comprise automated warehousing systems 147 that automatically remove products from and place products into inventory based, at least in part, on one or more supply chain plans generated by segmentation planner 110.

Retailers 148 may be any suitable entity that obtains one or more products to sell to one or more customers. Retailers 148 may (like the other one or more supply chain entities 140) comprise a corporate structure having a retail headquarters and one or more retail stores. Retail headquarters comprises a central planning office with oversight of one or more retail stores. Retailer 148 stores may comprise any online or brick-and-mortar store, including stores with shelving systems 149. One or more retail stores may sell products according to rules, strategies, orders, and/or guidelines developed by one or more retail headquarters. For example, retail headquarters may create supply chain plans that determine how the store will shelve or display one or more products. Although supply chain plan execution may be performed in part by one or more retail employees, embodiments contemplate automated configuration of shelving and retail displays. This may include, for example, automated robotic shelving machinery that places products on shelves or automated shelving that automatically adjusts based, at least in part, on the supply chain plans. Shelving systems 149 may comprise, for example, various racks, fixtures, brackets, notches, grooves, slots, or other attachment devices for fixing shelves in various configurations. These configurations may comprise shelving with adjustable lengths, heights, and other arrangements.

Although one or more supply chain entities 140 are shown and described as separate and distinct entities, the same entity may simultaneously act as any one of the one or more supply chain entities 140. For example, one or more supply chain entities 140 acting as manufacturer 144 can produce a product, and the same one or more supply chain entities 140 can act as supplier 142 to supply an item to itself or another one or more supply chain entities 140. Although one example of the supply chain network 100 is shown and described in FIG. 1, embodiments contemplate any configuration of supply chain network 100, without departing from the scope described herein.

In one embodiment, each of segmentation planner 110, inventory system 120, transportation network 130, computer 150, and supply chain entities 140 may be coupled with network 160 using communication links 170a-170e, which may be any wireline, wireless, or other link suitable to support data communications between segmentation planner 110 and network 160 during operation of the supply chain network 100. Although communication links 170a-170e are shown as generally coupling segmentation planner 110, inventory system 120, transportation network 130, one or more supply chain entities 140, and computer 150 to network 160, any of segmentation planner 110, inventory system 120, transportation network 130, one or more supply chain entities 140, and computer 150 may communicate directly with each other, according to particular needs.

In another embodiment, network 160 includes the Internet and any appropriate local area networks (LANs), metropolitan area networks (MANs), or wide area networks (WANs) coupling segmentation planner 110, inventory system 120, transportation network 130, one or more supply chain entities 140, and computer 150. For example, data may be maintained locally to, or externally of segmentation planner 110, inventory system 120, transportation network 130, one or more supply chain entities 140, and computer 150 and made available to one or more associated users of the segmentation planner 110, inventory system 120, transportation network 130, one or more supply chain entities 140, and computer 150 using network 160 or in any other appropriate manner. For example, data may be maintained in a cloud database at one or more locations external to segmentation planner 110, inventory system 120, transportation network 130, one or more supply chain entities 140, and computer 150 and made available to one or more associated users of segmentation planner 110, inventory system 120, transportation network 130, one or more supply chain entities 140, and computer 150 using the cloud or in any other appropriate manner. Those skilled in the art will recognize that the complete structure and operation of the network 160 and other components within supply chain network 100 are not depicted or described. Embodiments may be employed in conjunction with known communications networks and other components.

In accordance with principles of embodiments described herein, segmentation planner 110 may generate segments, supply chain plans, and/or instruction sets for the inventory of one or more supply chain entities 140 in supply chain network 100. Furthermore, segmentation planner 110, inventory system 120, and/or transportation network 130 may instruct automated machinery (i.e., robotic warehouse systems, robotic inventory systems, automated guided vehicles, mobile racking units, automated robotic production machinery 145, robotic devices and the like) to adjust product mix ratios, inventory levels at various stocking points, production of products of manufacturing equipment, proportional or alternative sourcing of one or more supply chain entities 140, the configuration and quantity of packaging and shipping of products, and the display of products at one or more retail locations based on one or more supply chain plans and instruction sets, generated plans and policies and/or current inventory or production levels. When the inventory of an item falls to a reorder point, segmentation planner 110 may then automatically adjust product mix ratios, inventory levels, production of products of manufacturing equipment, and proportional or alternative sourcing of one or more supply chain entities 140 until the inventory is resupplied to a target quantity.

For example, the methods described herein may include computers 150 receiving product data from automated machinery having at least one sensor and the product data corresponding to an item detected by the sensor of the automated machinery. The received product data may include an image of the item, an identifier, as described above, and/or other product data associated with the item (dimensions, texture, estimated weight, and any other like data). The method may further include computers 150 looking up the received product data in a database system associated with segmentation planner 110, inventory system 120, and/or transportation network 130 to identify the item corresponding to the product data received from the automated machinery.

Computers 150 may also receive, from the automated machinery, a current location of the identified item. Based on the identification of the item, computers 150 may also identify (or alternatively generate) a first mapping in the database system, where the first mapping is associated with the current location of the item. Computers 150 may also identify a second mapping in the database system, where the second mapping is associated with a past location of the identified item. Computers 150 may also compare the first mapping and the second mapping to determine if the current location of the identified item in the first mapping is different than the past location of the identified item in the second mapping. Computers 150 may then send instructions to the automated machinery based, at least in part, on one or more differences between the first mapping and the second mapping such as, for example, to locate an item to add to or remove from a shelf or an inventory of or shipment for one or more supply chain entities 140. In addition, or as an alternative, segmentation planner 110 may monitor the supply chain constraints of one or more items at one or more supply chain entities 140 and adjusts the orders and/or inventory of the one or more supply chain entities 140 based on the supply chain constraints.

Although the systems and methods are described below primarily in connection with supply chain network 100 solely for the sake of clarity, embodiments contemplate the systems and methods described herein generating segments in any business environment and with any number of participating customers, demographics, and/or other business entities, and in response to any number of features, intersections, products, and/or items.

Figure 2:
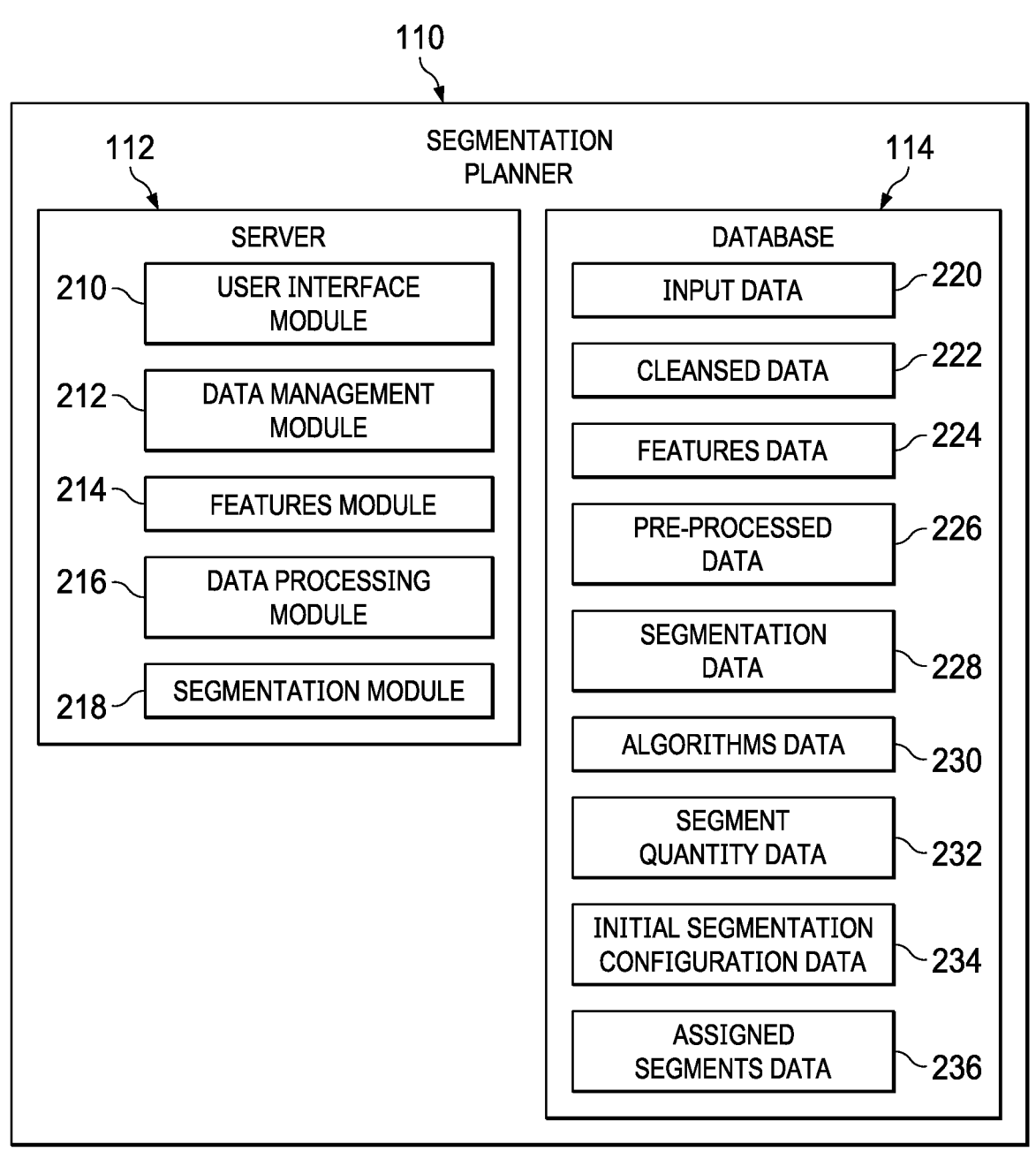
FIG. 2 illustrates a segmentation planner of FIG. 1 in greater detail in accordance with an embodiment.

FIG. 2 illustrates segmentation planner 110 of FIG. 1 in greater detail in accordance with an embodiment. As described above, segmentation planner 110 may comprise one or more computers 150 at one or more locations including associated input devices 152, output devices 154, non-transitory computer-readable storage media, processors 156, memory, or other components for receiving, processing, storing, and communicating information according to the operation of supply chain network 100. Additionally, segmentation planner 110 comprises server 112 and database 114. Although segmentation planner 110 is shown as comprising single server 112 and single database 114, embodiments contemplate any suitable number of computers 150, servers 112, or databases 114 internal to or externally coupled with segmentation planner 110. According to some embodiments, segmentation planner 110 may be located internal to one or more retailers 148 of one or more supply chain entities 140. In other embodiments, segmentation planner 110 may be located external to one or more retailers 148 of one or more supply chain entities 140 and may be located in, for example, a corporate retailer of one or more retailers 148, according to particular needs.

Server 112 of segmentation planner 110 may comprise user interface module 210, data management module 212, features module 214, data processing module 216, and segmentation module 218. Although server 112 is illustrated and described as comprising single user interface module 210, data management module 212, features module 214, data processing module 216, and segmentation module 218, embodiments contemplate any suitable number or combination of these located at one or more locations, local to, or remote from the segmentation planner 110, such as on multiple servers 112 or computers 150 at any location in supply chain network 100.

According to embodiments, user interface module 210 receives and processes a user input, such as, for example, input received by input device 152 of one or more computers 150. One or more computers 150 may transmit input to segmentation planner 110 using one or more communication links 170a-170e. User interface module 210 may register the input from one or more computers 150 and transmit the input to data management module 212 and/or features module 214, data processing module 216, and segmentation module 218. In an embodiment, user interface module 210 generates and displays a user interface (UI), such as, for example, a graphical user interface (GUI), that displays one or more interactive visualizations of segmentations, features, intersections, and/or other data. User interface module 210 may generate one or more GUI displays. The one or more GUI displays may convey information, including supply chain plan data, segmentation data, and/or any other type of information about supply chain network 100 and segmentation.

Data management module 212 may access input data 220 stored in segmentation planner database 114, and may transform input data 220 to generate cleansed data 222. Features module 214 may access cleansed data 222 and may analyze cleansed data 222 to locate one or more features. Having located one or more features, features module 214 may store the one or more features in features data 224 of segmentation planner database 114.

Data processing module 216 may access features data 224 and may perform pre-processing actions on features data 224 to generate pre-processed data 226. Data processing module 216 may store pre-processed data 226 in segmentation planner database 114 pre-processed data 226. Segmentation module 218 may perform multi-dimension segmentation on pre-processed data 226 and may compute feature importance to generate segments, which segmentation module 218 may store in segmentation data 228, as described in greater detail below.

Database 114 of segmentation planner 110 may comprise one or more databases 114 or other data storage arrangements at one or more locations, local to, or remote from, the server 112. Database 114 may comprise, for example, input data 220, cleansed data 222, features data 224, pre-processed data 226, segmentation data 228, algorithms data 230, segment quantity data 232, initial segmentation configuration data 234, and assigned segments data 236. Although database 114 is shown and described as comprising input data 220, cleansed data 222, features data 224, pre-processed data 226, segmentation data 228, algorithms data 230, segment quantity data 232, initial segmentation configuration data 234, and assigned segments data 236, embodiments contemplate any suitable number or combination of these, located at one or more locations, local to, or remote from, the segmentation planner 110 according to particular needs.

Input data 220 may comprise, for example, any data relating to supply chain system. Input data 220 may comprise data relating to supply chain entities 140, previous supply chain plans, transactions and shipments between supply chain entities 140, or past sales, past demand, purchase data, promotions, events, or the like of one or more products and/or one or more supply chain entities 140. Input data 220 may comprise data regarding one or more features assigned to one or more products, items, or resources manufactured, transported, or sold throughout supply chain system. Input data 220 may be stored at time intervals such as, for example, by the minute, hour, daily, weekly, monthly, quarterly, yearly, or any suitable time interval, including substantially in real time.

Cleansed data 222 may comprise data in which data management module 212 has determined segment intersections, converted input data 220 from one data storage format into another data storage format, and/or executed any other data modification or cleansing actions. Features data 224 may comprise data in which features module 214 has discovered one or more features, aggregated or dis-aggregated cleansed data 222, and/or executed any other feature discovery actions. Pre-processed data 226 may comprise data that have been pre-processed by data processing module 216 to standardize features data 224 (such as, for example, by standardizing the granularity of the features data 224 and all features stored in the features data 224; standardizing units of measure or currency of the features data 224 and all features stored in the features data 224; and/or performing any other pre-processing actions to standardize the features data 224).

Segmentation data 228 may comprise data relating to one or more segments generated by segmentation module 218, as described in greater detail below. Algorithms data 230 may comprise data related to one or more algorithms accessed by the segmentation module 218 to perform autonomous segmentation. Segment quantity data 232 may store the segment quantity selected by segmentation module 218 during the actions of the segment analysis method 400 described in greater detail below. Initial segmentation configuration data 234 may comprise data related to one or more initial segment configurations, generated by segmentation module 218 during the actions of the segment analysis method 400. Assigned segments data 236 comprises data related to one or more assigned segments generated by segmentation module 218 during the actions of the segment analysis method 400. According to embodiments, assigned segments data 236 may also comprise data relating to the relative importance of one or more features stored in assigned segments data 236.

Figure 3:
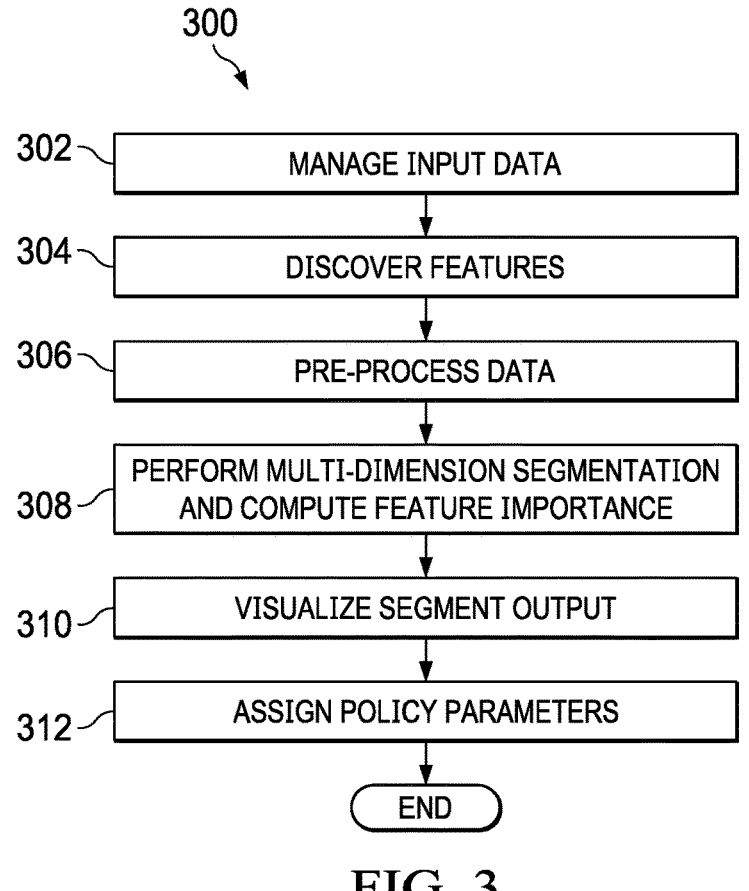
FIG. 3 illustrates an exemplary segment generation and visualization method in which the segmentation planner generates and visualizes segments, according to an embodiment.

FIG. 3 illustrates an exemplary segment generation and visualization method 300 in which segmentation planner 110 generates and visualizes segments, according to an embodiment. The following segment generation and visualization method 300 proceeds by one or more actions, which although described in a particular order may be performed in one or more permutations, combinations, orders, or repetitions, according to particular needs.

At activity 302 of segment generation and visualization method 300, data management module 212 manages input data 220 and generates cleansed data 222. Data management module 212 accesses input data 220 stored in segmentation planner database 114. In an embodiment, data management module 212 determines segment intersections based on input data 220. By way of further explanation only and not by way of limitation, an example of input data 220 is given for three items (Item A, Item B and Item C), each of which is stored in various quantities of stock at three locations (Supplier X, Supplier Y, and Supplier Z). Data management module 212 may select granular intersections, in which the exact quantity of each item at each location is imported into cleansed data 222. Continuing with the previous example, data management module 212 may select an exact quantity of each of Item A, Item B and Item C at each of Supplier X, Supplier Y, and Supplier Z to be imported into cleansed data 222. In other embodiments, data management module 212 may select broader, less granular intersections. For the example Item A, Item B, and Item C, data management module 212 may select only the total quantities of Item A, Item B and Item C across all three Supplier X, Supplier Y, and Supplier Z are imported into cleansed data 222. This example is provided for illustrative purposes only, and embodiments contemplate data management module 212 selecting any form of segment intersections while generating cleansed data 222, using any intersection selection criteria, according to particular needs. In some embodiments, user interface module 210 responds to input to one or more input devices 152, and selects one or more segment intersections directly.

Data management module 212 may transform input data 220 to generate cleansed data 222. Data transformation may comprise converting input data 220 from one data storage format into another data storage format; copying one or more pre-discovered features stored in input data 220 into cleansed data 222; removing one or more pre-discovered features stored in input data 220; and/or any other data modification or cleansing actions. Having generated cleansed data 222, data management module 212 stores cleansed data 222 in segmentation planner database 114.

At activity 304 of segment generation and visualization method 300, features module 214 discovers features. Features module 214 accesses cleansed data 222 and discovers features in cleansed data 222 to generate features data 224. In an embodiment, features module 214 accesses cleansed data 222 and aggregates cleansed data 222, dis-aggregates cleansed data 222, or both, based on one or more segment intersections to discover features and generate features data 224. Features module 214 may aggregate and/or dis-aggregate cleansed data 222 based on, for example, a selection of one or more products or resources manufactured, transported, or sold throughout supply chain system; one or more locations or geographic regions throughout supply chain system; or based on any other selection or intersection, according to particular needs. Features module 214 may aggregate and/or dis-aggregate cleansed data 222 using one or more direct input features (such as, for example, price), and/or one or more derived features (such as, for example, coefficient of variability) that features module 214 may compute based on one or more other features stored in cleansed data 222. Having discovered one or more features, features module 214 stores the one or more features in features data 224. In an embodiment, user interface module 210 receives one or more features directly into features data 224 in response to input to one or more input devices 152.

At activity 306 of segment generation and visualization method 300, data processing module 216 pre-processes features data 224 to generate pre-processed data 226. According to embodiments, data processing module 216 may access features data 224 and pre-process features data 224 in order to standardize features data 224 (such as, for example, by standardizing the granularity of features data 224 and all features stored in features data 224; standardizing units of measure or currency of features data 224 and all features stored in features data 224; and/or performing any other pre-processing actions to standardize features data 224). In an embodiment, data processing module 216 reduces the dimensions of one or more features stored in features data 224 to emphasize one or more other features and eliminate redundant features. Data processing module 216 may perform data interpretation on features data 224 to emphasize one or more numerical features, and/or one or more string features, in pre-processed data 226. Having generated pre-processed data 226, data processing module 216 stores pre-processed data 226 in segmentation planner database 114.

At activity 308 of segment generation and visualization method 300, segmentation module 218 performs multi-dimension segmentation on pre-processed data 226 and computes feature importance to generate segments. In an embodiment, segmentation module 218 accesses pre-processed data 226 and performs the actions of segment analysis method 400, described in greater detail below and illustrated by FIG. 4, to generate segments. Having generated one or more segments, segmentation module 218 stores the one or more segments in segmentation data 228.

At activity 310 of segment generation and visualization method 300, user interface module 210 visualizes segment output. User interface module 210 accesses segmentation data 228 and generates one or more GUI displays, suitable for output on one or more computer 150 output devices 154, to visualize the segment output.

At activity 312 of segment generation and visualization method 300, user interface module 210 assigns policy parameters to segmentation data 228. In an embodiment, user interface module 210 responds to input to one or more input devices 152, and assigns one or more policy parameters to one or more segments stored in segmentation data 228. By way of example and not by way of limitation, policy parameters may comprise assigning service levels of 90%, 95%, 99%, or any other level to one or more segments. Having assigned one or more policy parameters to one or more segments in segmentation data 228, segmentation planner 110 terminates segment generation and visualization method 300.

Figure 4:
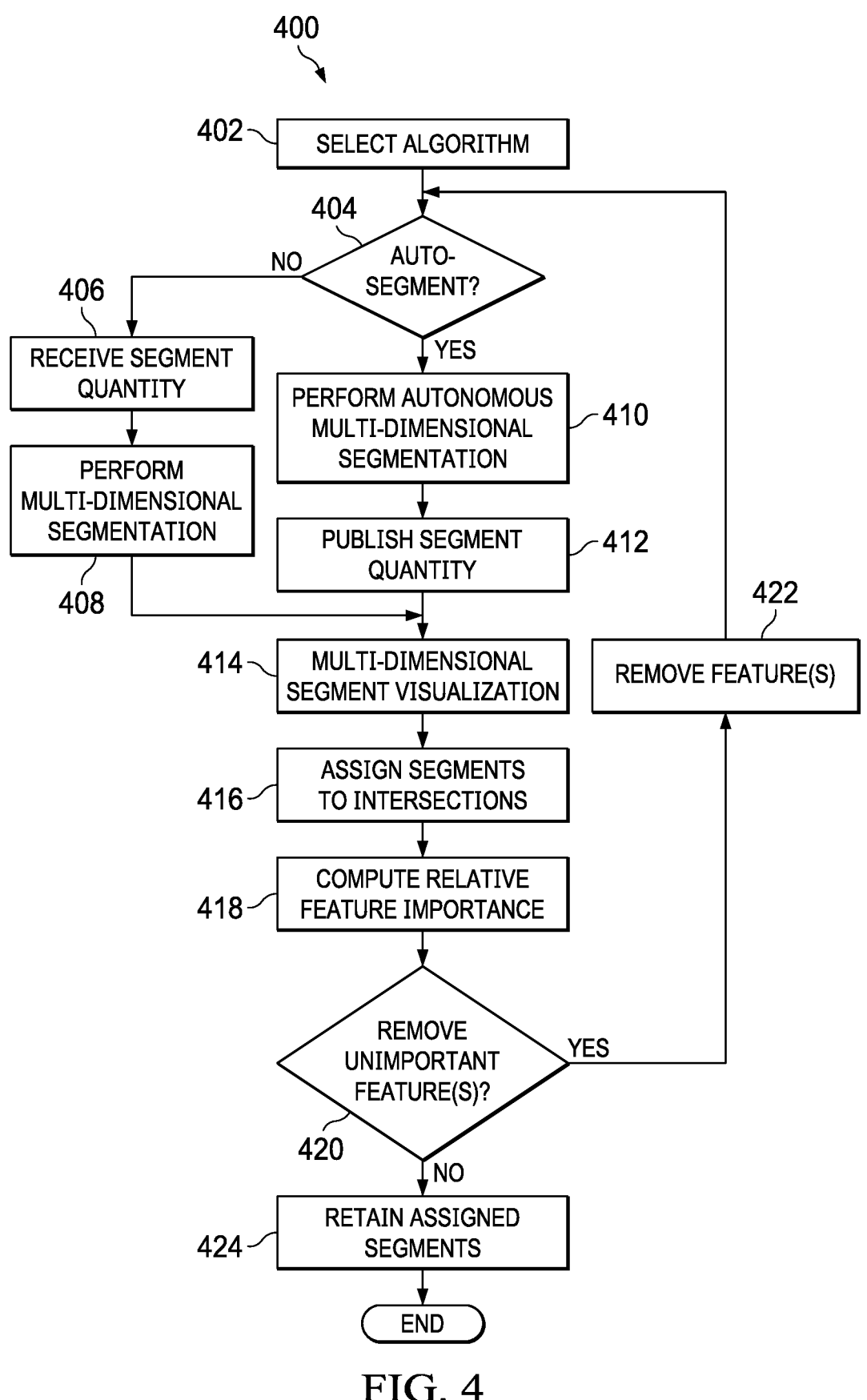
FIG. 4 illustrates an exemplary segment analysis method in which the segmentation planner analyzes segments, according to an embodiment.

FIG. 4 illustrates an exemplary segment analysis method 400 in which segmentation planner 110 analyzes segments, according to an embodiment. The following segment analysis method 400 proceeds by one or more actions, which although described in a particular order may be performed in one or more permutations, combinations, orders, or repetitions, according to particular needs.

At activity 402 of segment analysis method 400, segmentation module 218 selects an algorithm with which to perform auto-segmentation at activity 404 of segment analysis method 400. In an embodiment, segmentation module 218 accesses algorithms data 230, and selects an algorithm from a selection of one or more algorithms stored in algorithms data 230, to perform auto-segmentation. According to embodiments, segmentation module 218 may select an algorithm based on whether the data stored in pre-processed data 226 is string-based or numerical-based, with some algorithms tailored for use with string-based data and other algorithms tailored for use with numerical-based data. In other embodiments, user interface module 210 may respond to input made to one or more input devices 152, and may directly select an algorithm from a selection of one or more algorithms stored in algorithms data 230.

At activity 404 of segment analysis method 400, segmentation module 218 determines whether to proceed to activity 406 of segment analysis method 400 and receive a specified segment quantity from user interface module 210, or to proceed to activity 410 of segment analysis method 400 and perform autonomous multi-dimensional segmentation, including but not limited to computing a segment quantity autonomously. Segmentation module 218 may respond to input from user interface module 210, including but not limited to input to one or more input devices 152 detected by user interface module 210, to determine whether to proceed to activity 406 or activity 410 of segment analysis method 400.

At activity 406 of segment analysis method 400, segmentation module 218 receives a specified segment quantity from user interface module 210. In an embodiment, user interface module 210 receives a quantity of segments (such as, for example, ten, twenty, fifty, or any other number) as input to one or more input devices 152. User interface module 210 transmits the received segment quantity input to segmentation module 218. Segmentation module 218 stores the segment quantity in segment quantity data 232, and proceeds to activity 408 of segment analysis method 400 to perform multi-dimensional segmentation.

At activity 408 of segment analysis method 400, segmentation module 218 performs multi-dimensional segmentation. Segmentation module 218 accesses segment quantity data 232 and generates an initial segmentation configuration using the segment quantity stored in segment quantity data 232. Segmentation module 218 stores the initial segmentation configuration in initial segmentation configuration data 234, and proceeds to activity 414 of segment analysis method 400 to perform multi-dimensional segment visualization.

In other embodiments in which segmentation module 218 does not receive a specified segment quantity from user interface module 210, segmentation module 218 proceeds from activity 404 of segment analysis method 400 to activity

410 of segment analysis method 400 and performs autonomous multi-dimensional segmentation. According to embodiments, segmentation module 218 uses an artificial intelligence (AI) or machine learning (ML) segmentation with autonomous selection of features. Embodiments contemplate segmentation module 218 performing autonomous multi-dimensional segmentation and computing a segment quantity autonomously using other suitable methods or processes. Having autonomously computed a segment quantity, segmentation module 218 stores the segment quantity in segment quantity data 232. Segmentation module 218 may generate an initial segmentation configuration using the segment quantity stored in segment quantity data 232. Segmentation module 218 stores the initial segmentation configuration in initial segmentation configuration data 234, and proceeds to activity 412 of segment analysis method 400.

At activity 412 of segment analysis method 400, segmentation planner 110 publishes the segment quantity that was computed during activity 410 of segment analysis method 400. According to embodiments, user interface module 210 may access the segment quantity stored in segment quantity data 232, and may generate one or more GUI displays visualizing the segment quantity stored in segment quantity data 232. Segmentation planner 110 proceeds to activity 414 of segment analysis method 400 to perform multi-dimensional segment visualization.

At activity 414 of segment analysis method 400, segmentation module 218 and user interface module 210 perform multi-dimensional segment visualization. User interface module 210 accesses the initial segmentation configuration stored in initial segmentation configuration data 234, and generates a GUI display visualizing the initial segmentation configuration.

At activity 416 of segment analysis method 400, segmentation module 218 assigns segments to intersections. In an embodiment, segmentation module 218 accesses initial segmentation configuration data 234 and pre-processed data 226, and assigns segments from initial segmentation configuration data 234 to item and/or product intersections, as well as one or more features, stored in pre-processed data 226. Segmentation module 218 stores the assigned segments from initial segmentation configuration data 234 in assigned segments data 236 of segmentation planner database 114.

At activity 418 of segment analysis method 400, segmentation module 218 computes the relative importance of one or more features stored in assigned segments data 236. According to embodiments, segmentation module 218 may use one or more of any algorithms or processes to compute the relative importance of one or more features stored in assigned segments data 236, including but not limited to a boundary analysis of how each feature participates in interacting with one or more segments. Segmentation module 218 computes a relative importance score for each of the one or more features stored in assigned segments data 236. Segmentation module 218 stores the relative importance score for each feature associated with each feature in assigned segments data 236.

At activity 420 of segment analysis method 400, segmentation module 218 determines whether to proceed to activity 422 of segment analysis method 400 and remove one or more unimportant features, or to proceed to activity 424 of segment analysis method 400 and retain assigned segments, features, and intersections. In an embodiment, user interface module 210 may generate a GUI display to visualize one or more relative importance scores for one or more features. Segmentation module 218 may respond to input from user interface module 210, including but not limited to input to one or more input devices 152 detected by user interface module 210, to determine whether to proceed to activity 422 or activity 424 of segment analysis method 400.

At activity 422 of segment analysis method 400, segmentation module 218 removes one or more features. According to embodiments, segmentation module 218 may access the segments, features, intersections, and feature relative importance scores stored in assigned segments data 236. Segmentation module 218 may remove one or more features associated with relative importance scores lower than a defined threshold. Having removed one or more features, segmentation module 218 may return to activity 404 of segment analysis method 400, and continue the actions described above.

At activity 424 of segment analysis method 400, segmentation module 218 retains the assigned segments, features, and intersections. Segmentation module 218 accesses the assigned segments, features, and intersections stored in assigned segments data 236, and stores data associated with the assigned segments, features, and intersections in segmentation data 228. Segmentation module 218 then terminates segment analysis method 400.

To illustrate the operation of segmentation planner 110 executing the actions of segment generation and visualization method 300 and segment analysis method 400, the following example is provided. In this example, segmentation planner 110 accesses input data 220 and generates ten segments for input data 220 comprising four features (unit price, historical demand volume, life cycle stage, and item category). Although a particular example of segmentation planner 110 generating segments is provided herein, embodiments contemplate segmentation planner 110 implementing the actions of segment generation and visualization method 300, and/or segment analysis method 400, in any order and with respect to any input data 220, features, intersections, or other circumstances, according to particular needs.

In this example, at activity 302 of segment generation and visualization method 300, data management module 212 manages input data 220 and generates cleansed data 222. Data management module 212 accesses input data 220 stored in segmentation planner database 114. In this example, input data 220 comprises unit price data, historical demand volume data, life cycle stage data, and item category data for a collection of products sold in and transported throughout a supply chain network 100. The data management module 212 generates cleansed data 222 in a single data storage format and stores the cleansed data 222 in the segmentation planner database 114.

Continuing the example, at activity 304 of segment generation and visualization method 300, features module 214 discovers features. Features module 214 accesses cleansed data 222, aggregates or dis-aggregates cleansed data 222 based on segment intersections, discovers any direct input features in cleansed data 222, computes any derived features, and generates features data 224. In this example, features module 214 discovers four direct input features: unit price, historical demand volume, life cycle stage, and item category. Further, in this example, features module 214 computes four derived features: average demand interval, demand COV, forecast, and forecast revenue.

Continuing the example, at activity 306 of segment generation and visualization method 300, data processing module 216 pre-processes features data 224 to generate pre-processed data 226. In this example, data processing module 216 identifies forecast revenue, historical demand volume, life cycle stage, and item category as correlated to one or more of the other features, determines that the correlations are within the threshold for removal, and removes forecast revenue, historical demand volume, life cycle stage, and item category to reduce dimensional complexity and redundancy.

Figure 5:
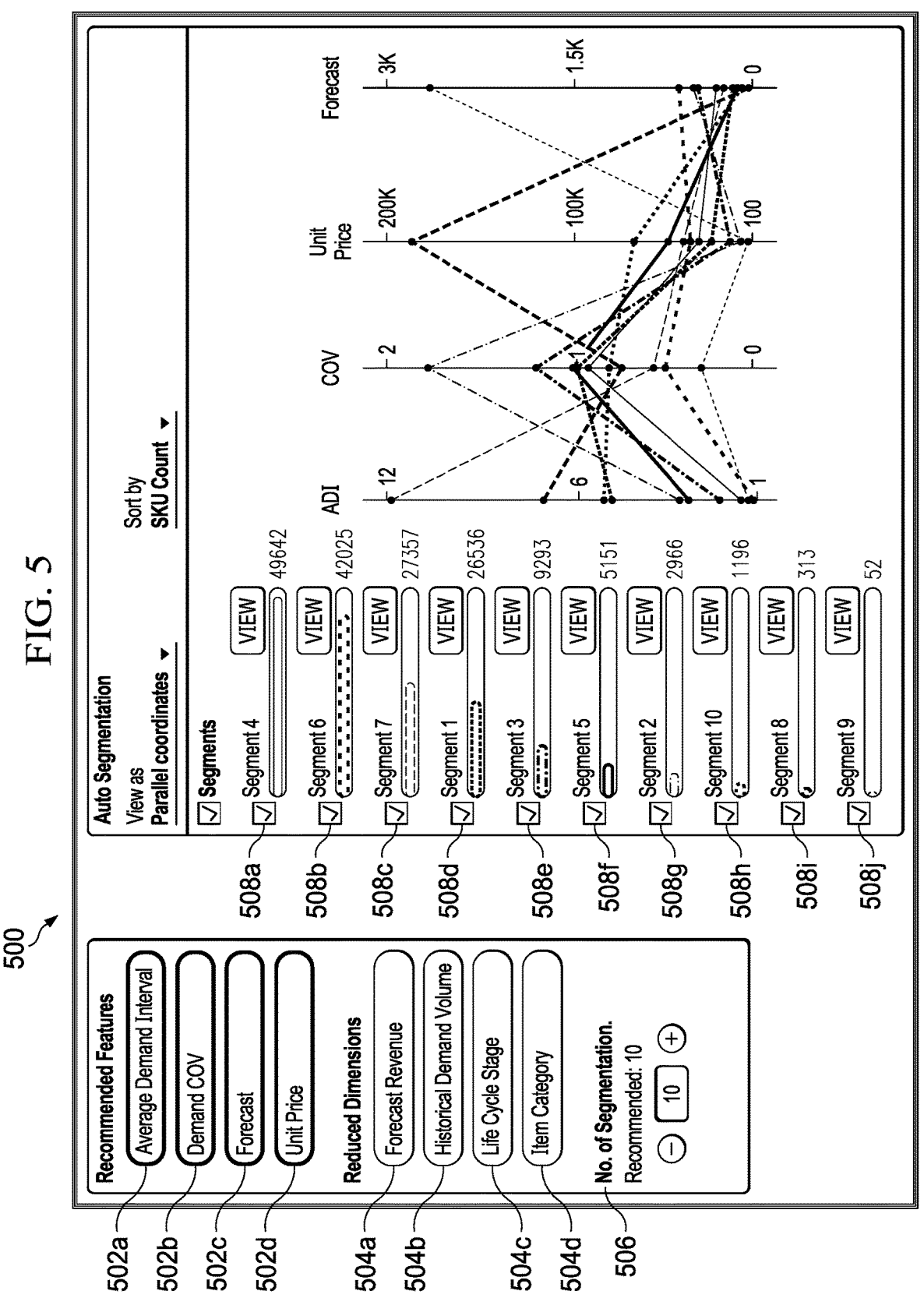
FIG. 5 illustrates an initial segment configuration visualization, according to an embodiment.

FIG. 5 illustrates initial segment configuration visualization 500, according to an embodiment. Initial segment configuration visualization 500 may display one or more recommended features 502a-502d, one or more reduced features 504a-504d, a segment quantity selector 506, and one or more display segments 508a-508j, according to embodiments. Although particular examples of initial segment configuration visualization 500 is illustrated and described herein, embodiments contemplate user interface module 210 generating initial segment configuration visualization 500 in any configuration and displaying any data, according to particular needs.

Continuing the example, initial segment configuration visualization 500 illustrates four recommended features: average demand interval 502a, demand COV 502b, forecast 502c, and unit price 502d. Initial segment configuration visualization 500 further illustrates four reduced features removed by data processing module 216: forecast revenue 504a, historical demand volume 504b, life cycle stage 504c, and item category 504d.

At activity 308 of segment generation and visualization method 300, segmentation module 218 performs multi-dimension segmentation on pre-processed data 226 and computes feature importance to generate segments. In this example, segmentation module 218 accesses pre-processed data 226 and performs segment analysis method 400 described above to generate segments. Segmentation module 218 begins activity 402 of segment analysis method 400 and selects an algorithm with which to perform auto-segmentation at second activity 404 of segment analysis method 400. In this example, pre-processed data 226 is numerical-based, and segmentation module 218 selects a numerical-based algorithm with which to perform auto-segmentation.

Continuing the example, at activity 404 of segment analysis method 400, segmentation module 218 determines that user interface module 210 has not specified a segment quantity to use during segment analysis method 400. A second example where user interface module 210 specifies a segment quantity is described further in FIG. 6 below. Segmentation module 218 moves to activity 410 of segment analysis method 400 and performs autonomous multi-dimensional segmentation. Segmentation module 218 autonomously computes a segment quantity. In the embodiment illustrated by this example, segmentation module 218 chooses, and stores in segment quantity data 232, ten segments at activity 410 of segment analysis method 400. Segmentation module 218 accesses segment quantity data 232 and generates an initial segmentation configuration using the ten segments stored in segment quantity data 232. Segmentation module 218 stores the initial segmentation configuration in initial segmentation configuration data 234, and proceeds to activity 412 of segment analysis method 400. At activity 412 of segment analysis method 400, segmentation planner 110 publishes the segment quantity that was computed during activity 410 of segment analysis method 400, and proceeds to activity 414 of segment analysis method 400.

Continuing the example, at activity 414 of segment analysis method 400, segmentation module 218 and user interface module 210 perform multi-dimensional segment visualization. User interface module 210 accesses the initial segmentation configuration stored in initial segmentation configuration data 234, and generates ten display segments 508a-508j chosen by segmentation module 218 visualizing each segment's relationship to each of average demand interval 502a, demand COV 502b, forecast 502c, and unit price 502d, as shown in FIG. 5.

In a second example, auto-segmentation is not chosen at activity 404 of segment analysis method 400, instead proceeding to activity 406 where user interface module 210 receives input from segment quantity selector 506 specifying a reduced quantity of five segments. User interface module 210 then transfers the segment quantity to segmentation module 218. At activity 408, segmentation module 218 performs multi-dimensional segmentation and generates reduced segment configuration visualization 600.

Figure 6:
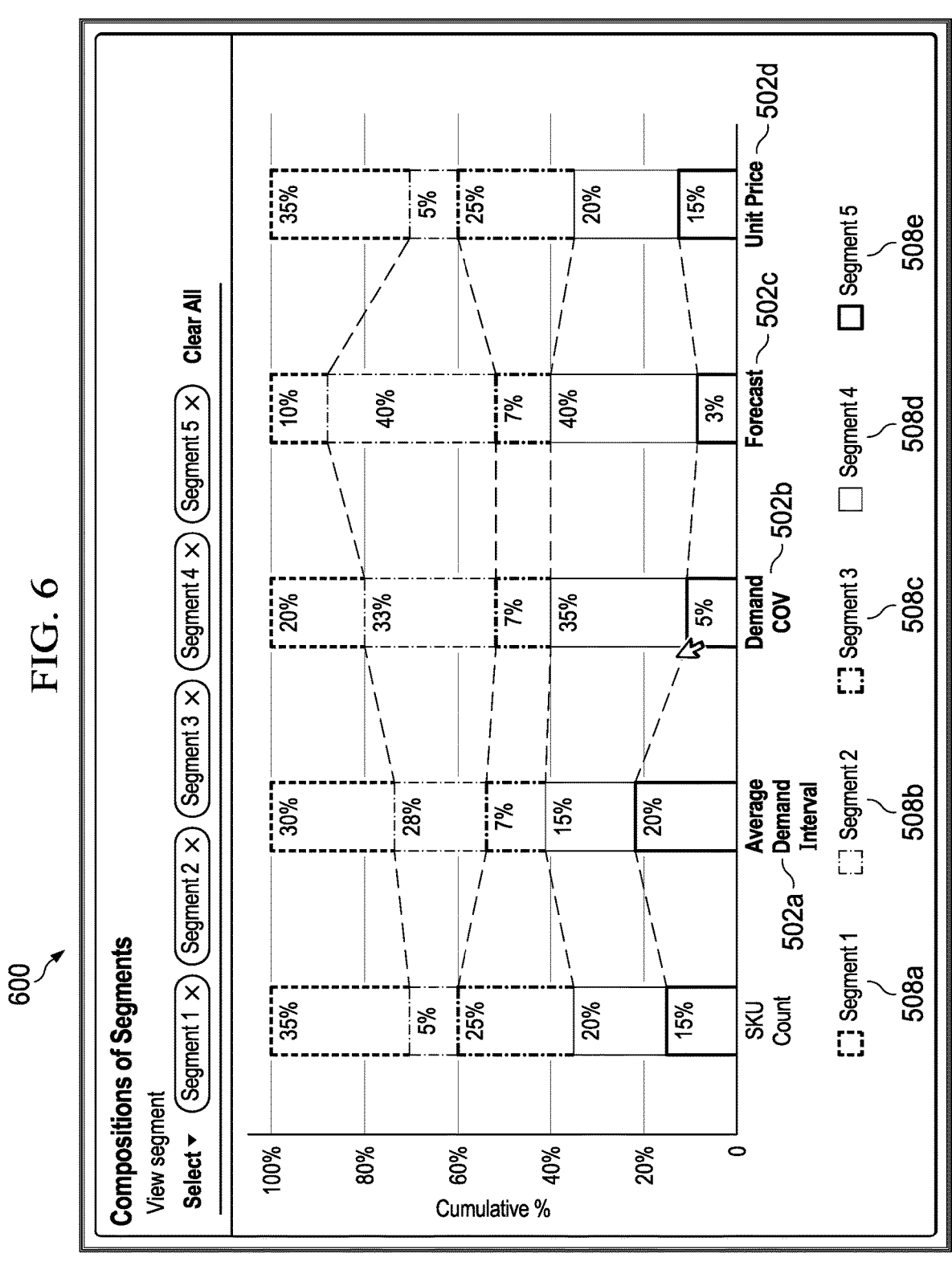
FIG. 6 illustrates a reduced segment configuration visualization, according to an embodiment.

FIG. 6 illustrates reduced segment configuration visualization 600, according to an embodiment. Reduced segment configuration visualization 600 may display visualization 600 comprising one or more display segments 508a-508e selected by user interface module 210 and one or more features 502a-502d, according to embodiments. Although particular examples of reduced segment configuration visualization 500 are illustrated and described herein, embodiments contemplate user interface module 210 generating reduced segment configuration visualization 500 in any configuration and displaying any data, according to particular needs.

Continuing the second example, reduced segment configuration visualization 600 illustrates five display segments 508a-508e, which user interface module 210 transferred to segmentation module 218, with respect to each segment's relationship to each of average demand interval 502a, demand COV 502b, unit price 502c, and forecast 502d with respect to the number of SKUs in each display segment 508a-508e. At activity 416 of segment analysis method 400, segmentation module 218 assigns display segments 508a-508e to intersections and recommended features 502a-502d. Segmentation module 218 accesses initial segmentation configuration data 234 and pre-processed data 226, and assigns display segments 508a-508e from initial segmentation configuration data 234 to item and/or product intersections, as well as one or more recommended features 502a-502d, stored in pre-processed data 226. Segmentation module 218 stores the assigned display segments 508a-508e from initial segmentation configuration data 234 in assigned segments data 236 of segmentation planner database 114.

Continuing the example, at activity 418 of segment analysis method 400, segmentation module 218 computes the relative importance of one or more recommended features 502a-502d stored in assigned segments data 236. Segmentation module 218 stores the relative importance score 702 for each recommended feature 502a-502d in assigned segments data 236 and generates segmentation importance score visualization 700 displaying the relative importance scores 702.

Figure 7:
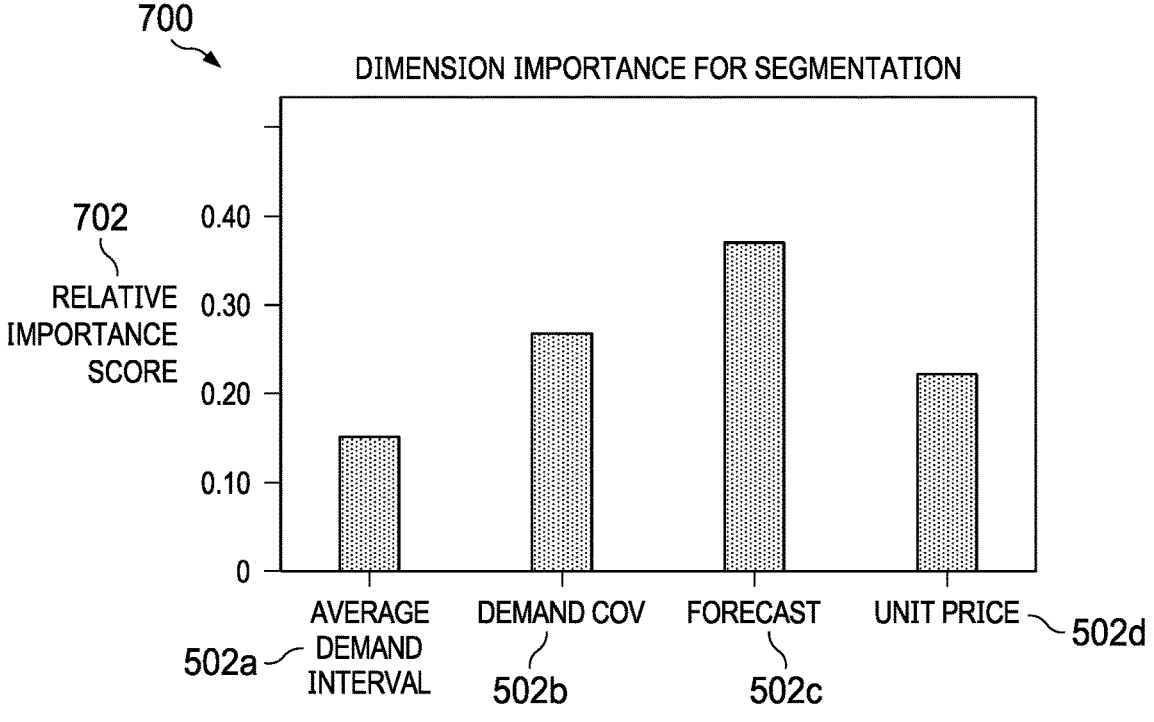
FIG. 7 illustrates a segmentation importance score visualization, according to an embodiment.

FIG. 7 illustrates segmentation importance score visualization 700, according to an embodiment. Segmentation importance score visualization 700 may display relative importance scores 702 for one or more recommended features 502a-502d, according to embodiments. Although particular examples of segmentation importance score visualization 700 are illustrated and described herein, embodiments contemplate segmentation module 218 generating segmentation importance score visualization 700 in any configuration and displaying any data, according to particular needs.

Continuing the example, segmentation importance score displays 700 illustrates four relative importance scores 702 computed by segmentation module 218 with respect to each recommended feature: average demand interval 502*a*, demand COV 502*b*, unit price 502*c*, and forecast 502*d*. At activity 420 of segment analysis method 400, segmentation module 218 determines that all recommended features 502*a*-502*d* are important, and proceeds to activity 424 of segment analysis method 400. Segmentation module 218 retains the assigned display segments 508*a*-508*e*, recommended features 502*a*-502*d*, and intersections, and stores data associated with the assigned display segments 508*a*-508*e*, recommended features 502*a*-502*d*, and intersections in segmentation data 228. Segmentation module 218 then terminates the segment analysis method 400.

Continuing the example, at activity 310 of segment generation and visualization method 300, user interface module 210 visualizes segment output. User interface module 210 accesses segmentation data 228 and generates one or more GUI displays, suitable for output on one or more computer 150 output devices 154, to visualize the segment output. At activity 312 of segment generation and visualization method 300, user interface module 210 assigns policy parameters to segmentation data 228. Concluding the example, segmentation planner 110 then terminates segment generation and visualization method 300.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system of autonomous multi-dimensional segmentation, comprising:

a supply chain network comprising one or more supply chain entities; and a segmentation planner comprising a computer and memory, the segmentation planner configured to:

access input data relating to the one or more supply chain entities;

select an autonomous segmentation algorithm based on whether the input data is string-based or numerical-based;

discover one or more features related to the input data, wherein the one or more features comprise geographic features, demographic features, behavioral features and psychological features;

pre-process the input data and the one or more features;

perform multi-dimension segmentation on the input data;

compute a relative importance of the one or more features;

discard any feature whose relative importance is lower than a defined threshold;

generate a multi-dimension segmentation visualization;

assign policy parameters comprising one or more service levels to the multi-dimension segmentation performed on the input data; and control manufacturing equipment to adjusting one or more levels of manufacturing based, at least in part, on the one or more service levels.

2. The system of claim 1, wherein the segmentation planner is further configured to:

generate cleansed data from the input data;

discover one or more features related to the cleansed data to generate features data; and pre-process the features data to generate pre-processed data.

3. The system of claim 1, wherein the segmentation planner utilizes machine learning to perform autonomous segmentation on the pre-processed data and one or more features.

4. The system of claim 2, wherein the segmentation planner is further configured to:

import the cleansed data;

in response to the segmentation planner identifying one or more segment intersections, perform one or more of the following:

aggregate the cleansed data based on one or more segment intersections; and disaggregate the cleansed data based on one or more segment intersections;

identify one or more direct input features; and compute one or more derived features based on one or more direct input features.

5. The system of claim 1, wherein the segmentation planner is further configured to:

standardize the input data and features; and in response to the segmentation planner determining that a correlation between at least two features is within a defined threshold, delete at least one of the features associated with the correlation.

6. A computer-implemented method of autonomous multi-dimensional segmentation, comprising:

accessing input data relating to one or more supply chain entities;

selecting an autonomous segmentation algorithm based on whether the input data is string-based or numerical-based;

discovering one or more features related to the input data, wherein the one or more features comprise geographic features, demographic features, behavioral features and psychological features;

pre-processing the input data and the one or more features;

performing multi-dimension segmentation on the input data;

computing a relative importance of the one or more features;

discarding any feature whose relative importance is lower than a defined threshold;

generating a multi-dimension segmentation visualization;

assigning policy parameters comprising one or more service levels to the multi-dimension segmentation performed on the input data; and controlling manufacturing equipment to adjusting one or more levels of manufacturing based, at least in part, on the one or more service levels.

7. The computer-implemented method of claim 6, further comprising:

generating cleansed data from the input data;

discovering one or more features related to the cleansed data to generate features data; and pre-processing the features data to generate pre-processed data.

8. The computer-implemented method of claim 6, further comprising the segmentation planner utilizing machine learning to perform autonomous segmentation on the pre-processed data and one or more features.

9. The computer-implemented method of claim 7, further comprising:

importing the cleansed data;

in response to the segmentation planner identifying one or more segment intersections, performing one or more of the following:

aggregating the cleansed data based on one or more segment intersections; and disaggregating the cleansed data based on one or more segment intersections;

identifying one or more direct input features; and computing one or more derived features based on one or more direct input features.

10. The computer-implemented method of claim 6, further comprising:

standardizing the input data and features; and in response to the segmentation planner determining that a correlation between at least two features is within a defined threshold, deleting at least one of the features associated with the correlation.

11. A non-transitory computer-readable medium embodied with software providing autonomous multi-dimensional segmentation, the software when executed:

accesses input data relating to one or more supply chain entities;

selects an autonomous segmentation algorithm based on whether the input data is string-based or numerical-based;

discovers one or more features related to the input data, wherein the one or more features comprise geographic features, demographic features, behavioral features and psychological features;

pre-processes the input data and the one or more features;

performs multi-dimension segmentation on the input data;

computes a relative importance of the one or more features;

discards any feature whose relative importance is lower than a defined threshold;

generates a multi-dimension segmentation visualization;

assigns policy parameters comprising one or more service levels to the multi-dimension segmentation performed on the input data; and controls manufacturing equipment to adjusting one or more levels of manufacturing based, at least in part, on the one or more service levels.

12. The non-transitory computer-readable medium of claim 11, the software when executed further:

generates cleansed data from the input data;

discovers one or more features related to the cleansed data to generate features data; and pre-processes the features data to generate pre-processed data.

13. The non-transitory computer-readable medium of claim 11, the software when executed further utilizes machine learning to perform autonomous segmentation on the pre-processed data and one or more features.

14. The non-transitory computer-readable medium of claim 12, the software when executed further:

imports the cleansed data;

in response to the segmentation planner identifying one or more segment intersections, performs one or more of the following:

aggregates the cleansed data based on one or more segment intersections; and disaggregates the cleansed data based on one or more segment intersections;

identifies one or more direct input features; and computes one or more derived features based on one or more direct input features.

15. The non-transitory computer-readable medium of claim 11, the software when executed further:

standardizes the input data and features; and in response to the segmentation planner determining that a correlation between at least two features is within a defined threshold, deletes at least one of the features associated with the correlation.

\*   \*   \*   \*   \*